VOLTAGE LEVEL DETECTOR

Filed Oct. 5, 1964

INVENTOR.
UWE A. POMMERENING
BY
Robert L. Nathans
ATTORNEY 3,409,784

VOLTAGE LEVEL DETECTOR

Uwe A. Pommerening, Webster, N.Y., assignor to General Dynamics Corporation, Rochester, N.Y., a corporation of Delaware Filed Oct. 5, 1964, Ser. No. 401,551
7 Claims. (Cl. 307—237)

ABSTRACT OF THE DISCLOSURE

A voltage level detector circuit is described including a transistor having base, emitter and collector electrodes with the collector electrode being connected to a voltage source by way of a first resistor. Second impedance means couples a voltage source to the emitter electrode. The impedance of the second means is adapted to decrease as the emitter-collector current increases. The emitter collector current increases in response to a control voltage applied to the base of the transistor whereby a relatively large voltage drop is produced across the first resistor which may be coupled to a threshold level device which produces large voltage level swings in response to the control voltage.

The present invention relates to voltage level detectors and, more particularly, to high input impedance detectors for producing large amplitude output signals indicative of very small voltage level changes applied to the input circuit.

In order to detect small changes in voltage level produced by a signal source, such as a capacitor, a control device having an unbypassed emitter-resistor is often utilized so that the circuit has a high input impedance and no power is drawn from the source. An output signal taken across a collector-resistor associated with the control device is utilized to drive a threshold device which produces large voltage level swings in response to the small changes in voltage level applied to the control terminal of the control device by the signal source. However, in view of the resulting negative feedback produced by this arrangement, current changes through the collector-resistor are very small and, accordingly, voltage changes at the output of the control device are also very small. Voltage changes at the output terminal or the collector of the control device due to variations in supply voltage and variations in the resistivity of the resistors and transistors will often be greater than the collector voltage variations due to small changes in the voltage of the input signal to be detected by the control device. Accordingly, reliability is poor for these circuits and they may give erroneous outputs unless the tolerances are very closely controlled.

Accordingly, it is the principal object of the present invention to provide a voltage level detector which employs a cathode resistor for providing a high input impedance and yet reliably detects very small changes in voltage level regardless of considerable tolerance variations in the components which make up the detector.

Figure 1:
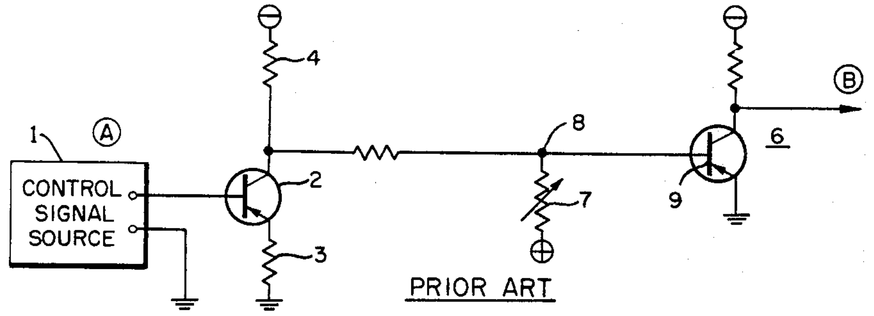
Figure 2:
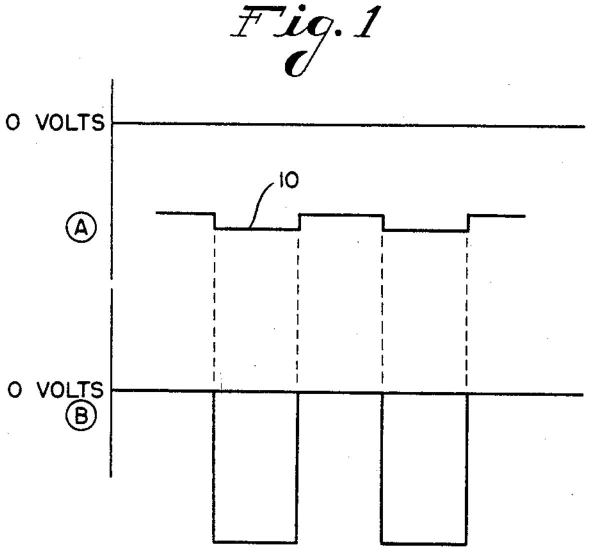
Figure 3:
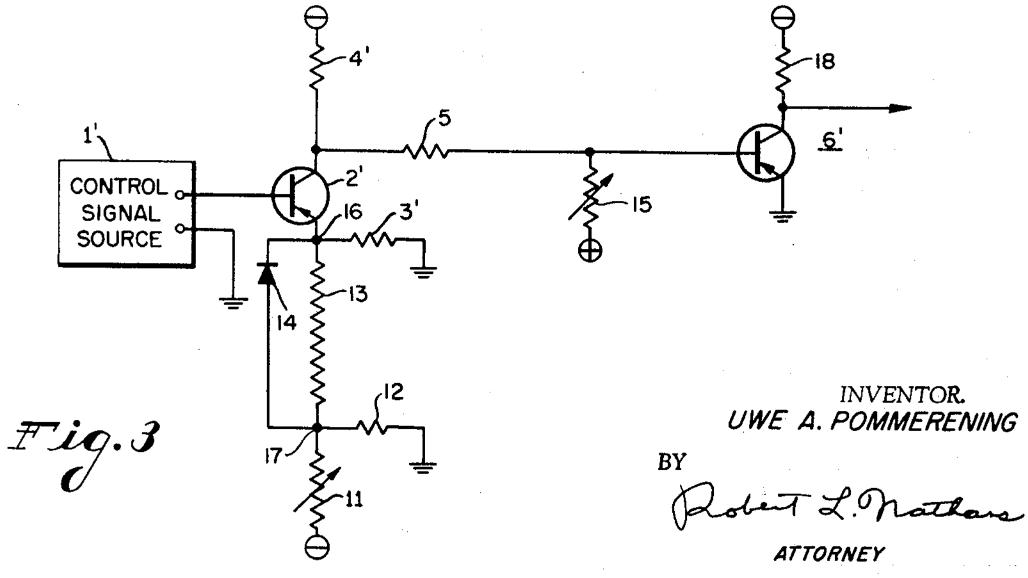

This and other objects and advantages of the present invention will become more apparent from the following detailed description, taken together with the accompanying drawings, in which:

FIG. 1 discloses a typical prior art voltage level detector;

FIG. 2 discloses a pulse diagram which will aid in the understanding of the operation of the detector; and FIG. 3 discloses a preferred embodiment of the present invention.

In FIG. 1, a control signal source 1 is coupled to the control circuit of transistor 2 which, in turn, is coupled to a D.C. power supply through an unbypassed emitter-resistor 3 and collector-resistor 4. The input signal to be detected is disclosed in FIG. 2A; whereas, the output signals produced by threshold device 6 are disclosed in FIG. 2B. As explained hereinbefore, cathode resistor 3 is utilized for the purpose of presenting a high input impedance to control signal source 1. Variable resistor 7 is adjusted so that the voltage at junction 8 will cause transistor 9 to conduct in the absence of a negative-going input signal 10, shown in FIG. 2A. When the voltage level applied to the control terminal of transistor 2 goes slightly negative to produce input pulse 10, the voltage at junction 8 goes positive which turns off transistor 9 so that the output voltage at point B goes sharply negative and remains negative until the cessation of input pulse 10. As discussed hereinbefore, the small voltage change which is to be detected at point A will merely produce a small voltage change at the collector of transistor 2, which change may be less than tolerance variations in the components, so that reliability is adversely affected and erroneous output signals may be produced.

In accordance with the present invention, circuitry is provided in shunt with the unbypassed emitter-resistor 3 which causes a sharp reduction in the emitter-to-ground resistivity upon the detection of a small amplitude voltage change at the control terminal of the control device. This change causes a sharp increase in the emitter-collector current which, in turn, causes a sharp increase in the voltage drop across the collector-resistor over and above the considerably smaller increased voltage drop which is produced by the effect of the small control signal per se, and, accordingly, reliability is assured without calling for more stringent component tolerances.

FIG. 3 includes the circuitry of FIG. 1. Threshold device 6' is coupled to control signal source 1' through transistor 2'. Cathode resistor 3' connects the emitter of transistor 2' to ground, as shown. A voltage divider comprising resistor 11 and resistor 12 causes a reference potential to be applied to resistor 13 and the anode of diode 14. Variable resistor 11 is adjusted so that diode 14 is back biased in the absence of a negative-going input signal 10, shown in FIG. 2A. As a result, a fairly high impedance is effectively introduced between the emitter and ground owing to the presence of resistor 3' and resistors 12 and 13. It should be noted at this time that the resistance of resistor 13 is high compared to the resistance of resistor 3'; whereas, the resistance of resistor 12 is low compared to the resistance of resistor 3'. Now let it be assumed that a negative-going pulse 10 of FIG. 2A is applied to the control terminal of transistor 2', which slightly increases the current flowing through resistor 3', the emitter-collector circuit of transistor 2' and resistor 4'. This action causes the voltage at junction 16 to become more negative with respect to the voltage at junction 17. Resistor 11 is adjusted so that this slight increase in the voltage at junction 16 will forward bias diode 14, which sharply reduces the shunt impedance between junction 16 and ground, which in turn causes a sharp increase in the current flowing through resistor 4', thereby to magnify the effect of control signal 10 upon threshold device 6'. When the voltage applied to the input terminal of transistor 2' goes less negative upon the cessation of pulse 10, the voltage at junction 16 will become less negative than the voltage at junction 17 so as to again back bias diode 14 so that resistor 13 is once more effective in sharply increasing the impedance in the emitter-collector circuit of transistor 2'.

Typical values for the embodiment of FIG. 3 are as follows:

| | | |
|---|---|---|
| $R_{11}$ | ohms | 2.37K |
| $R_{3'}$ | do | 294 |
| $R_{13}$ | do | 1.25K |
| $R_{12}$ | do | 42 |
| $R_{4'}$ | do | 5.1K |
| $R_5$ | do | 4.7K |
| $R_{15}$ | do | 5.1K |
| $R_{18}$ | do | 4.7K |
| Transistors | | SCL-7002/37 |
| Diode[14] | | GE 4JF2A-4 |

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed:

1. In combination, a control device having an input terminal, an output terminal and a control terminal, a D.C. power supply, a first impedance means coupled between the output terminal of said control device and the first terminal of said power supply, means for applying a varying signal potential to the control terminal of said control device to control the current flow through said first impedance means, and current control means coupled between said input terminal and said D.C. power supply, said current control means including a first resistor connected between said input terminal and a point of reference potential, second and third resistors connected between said input terminal and said point of reference potential, a unidirectional conduction device connected across said second resistor and polarized to pass current between said point of reference potential and said power supply first terminal in the same direction as said control device, means for applying biasing potentials at the junction of said second and third resistors for reverse biasing said unidirectional device, said current control means thereby having a first high value of impedance when the current through said first impedance means is below a particular predetermined amount and having a relatively low impedance as long as the current through said first impedance means is greater than said particular predetermined amount.

2. In combination, a control device having an input terminal, an output terminal, a D.C. power supply having a first and second terminal both at the same polarity with respect to a point of reference potential, a first impedance means coupled between the output terminal of said control device and the first terminal of said power supply, current control means coupled between the input terminal of said control device and the second terminal of said power supply, means for applying a varying signal potential to the control terminal of said control device to control the current flow through said first and second impedance means, and said current control means including a first resistor connected between said input terminal and a point of reference potential, second and third resistors connected between said input terminal and said point of reference potential, a unidirectional conduction device connected across said second resistor and polarized to pass current between said point of reference potential and said power supply first terminal in the same direction as said control device, a biasing resistor connected between said second power supply terminal and the junction between said second and third resistors, said current control means thereby having a first high value of impedance when the current through said first impedance means is below a particular predetermined amount and having a relatively low impedance as long as the current through said first impedance means is greater than said particular predetermined amount.

3. The invention as set forth in claim 2 wherein the resistance of said second resistor is greater than the resistance of said first resistor and the resistance of said first resistor is greater than the resistance of said third resistor.

4. In combination, a control device having an input terminal, an output terminal and a control terminal, a D.C. power supply having a first and second terminal, a first impedance means coupled between the output terminal of said control device and the first control terminal of said power supply, a second impedance means coupled between the input terminal of said control device and the second terminal of said D.C. power supply, means for applying a signal to the control terminal of said control device to increase the current flow through said first and second impedance means, a third impedance means coupled between the input terminal of said control device and a point of reference potential, short-circuiting means coupled in shunt with said third impedance means, and means for adjusting the voltage at said point of reference potential to cause said short-circuiting means to short-circuit said third impedance means as long as said signal is applied to said control terminal.

5. In combination, a control device having an input terminal, an output terminal and a control terminal, a D.C. power supply having a first and second terminal, a first impedance means coupled between the output terminal of said control device and the first control terminal of said power supply, a second impedance means coupled between the input terminal of said control device and the second terminal of said D.C. power supply, means for applying a signal to the control terminal of said control device to increase the current flow through said first and second impedance means, a third impedance means coupled between the input terminal of said control device and a point of reference potential, a fourth impedance means connected between said point of reference potential and the second terminal of said D.C. power supply, short-circuiting means coupled in shunt with said third impedance means, and means for adjusting the voltage at said point of reference potential to cause said short-circuiting means to short-circuit said third impedance means as long as said signal is applied to said control terminal.

6. In combination, a control device having an input terminal, an output terminal and a control terminal, a D.C. power supply having a first and second terminal, a first impedance means coupled between the output terminal of said control device and the first control terminal of said power supply, a second impedance means coupled between the input terminal of said control device and the second terminal of said D.C. power supply, means for applying a signal to the control terminal of said control device to increase the current flow through said first and second impedance means, a third impedance means coupled between the input terminal of said control device and a point of reference potential, a diode coupled in shunt with said third impedance means, and means for adjusting the voltage at said point of reference potential to cause said diode to be back biased in the absence of said signal applied to the control terminal of said control terminal of said control device and to cause said diode to become forward biased in the presence of said input signal thereby to substantially short-circuit said third impedance device.

7. In combination, a control device having an input terminal, an output terminal and a control terminal, a D.C. power supply having a first and second terminal, a first impedance means coupled between the output terminal of said control device and the first control terminal of said power supply, a second impedance means coupled between the input terminal of said control device and the second terminal of said D.C. power supply, means for applying a signal to the control terminal of said control device to increase the current flow through said first and second impedance means, a third impedance means coupled between the input terminal of said control device and a point of reference potential, a fourth impedance means connected between said point of reference potential and the second terminal of said D.C. power supply, a diode coupled in shunt with said third impedance means, and means for adjusting the voltage at said point of reference potential to cause said diode to be back biased in the absence of said input signal applied to the control terminal of said control device and to cause said diode to become forward biased in the presence of said input signal thereby to substantially short-circuit said third impedance device.

References Cited

UNITED STATES PATENTS

| | | | |
|---|---|---|---|
| 3,095,512 | 6/1963 | Little | 307—88.5 |
| 3,195,057 | 7/1965 | Longuemare et al. | 307—88.5 X |
| 3,235,746 | 2/1966 | Karnaugh | 307—88.5 |
| 3,280,342 | 10/1966 | Ashley | 307—88.5 |

JOHN S. HEYMAN, *Primary Examiner.*